(12) United States Patent
Ota

(10) Patent No.: US 8,314,915 B2
(45) Date of Patent: Nov. 20, 2012

(54) LIQUID CRYSTAL DISPLAY PANEL

(75) Inventor: Akio Ota, Tottori (JP)

(73) Assignee: Sony Corporation, Tokyo (JP)

( * ) Notice: Subject to any disclaimer, the term of this patent is extended or adjusted under 35 U.S.C. 154(b) by 328 days.

(21) Appl. No.: 12/472,946

(22) Filed: May 27, 2009

(65) Prior Publication Data

US 2009/0323005 A1 Dec. 31, 2009

(30) Foreign Application Priority Data

Jun. 27, 2008 (JP) .................................. 2008-168498

(51) Int. Cl.
*G02F 1/1343* (2006.01)

(52) U.S. Cl. ......................... 349/143; 349/139; 349/147

(58) Field of Classification Search ........................ None
See application file for complete search history.

(56) References Cited

U.S. PATENT DOCUMENTS

| | | | | |
|---|---|---|---|---|
| 2003/0184699 A1* | 10/2003 | Matsumoto et al. | .......... | 349/141 |
| 2004/0027525 A1* | 2/2004 | Itakura et al. | ................ | 349/141 |
| 2005/0128417 A1* | 6/2005 | Song et al. | ..................... | 349/150 |
| 2008/0123032 A1* | 5/2008 | Taniguchi et al. | ............ | 349/113 |
| 2010/0007835 A1* | 1/2010 | Shimomaki | ................... | 349/138 |
| 2011/0221737 A1* | 9/2011 | Kim | ............................. | 345/211 |

FOREIGN PATENT DOCUMENTS

| | | |
|---|---|---|
| JP | A-2005-258408 | 9/2005 |
| JP | A-2007-327997 | 12/2007 |
| JP | A-2008-32899 | 2/2008 |

\* cited by examiner

*Primary Examiner* — Michelle R Connelly

(74) *Attorney, Agent, or Firm* — K&L Gates LLP

(57) ABSTRACT

A liquid crystal display panel includes a pair of substrates having a liquid crystal layer interposed therebetween. One of the substrates includes a plurality of scanning lines and signal lines which are arrayed on a display region so as to form a matrix shape, a common wiring formed on a peripheral area surrounding the display region, an interlayer film, pixel electrodes, an inter-electrode insulating film, and a common electrode that is electrically connected to the common wiring. On the surface of the common electrode, or between the common electrode and the inter-electrode insulating film, a conductive layer, which is composed of a material of a conductivity superior to a conductivity of the transparent conductive material composing the common electrode, is formed at locations overlapped with locations at which the plurality of scanning lines and the signal lines are formed.

6 Claims, 7 Drawing Sheets

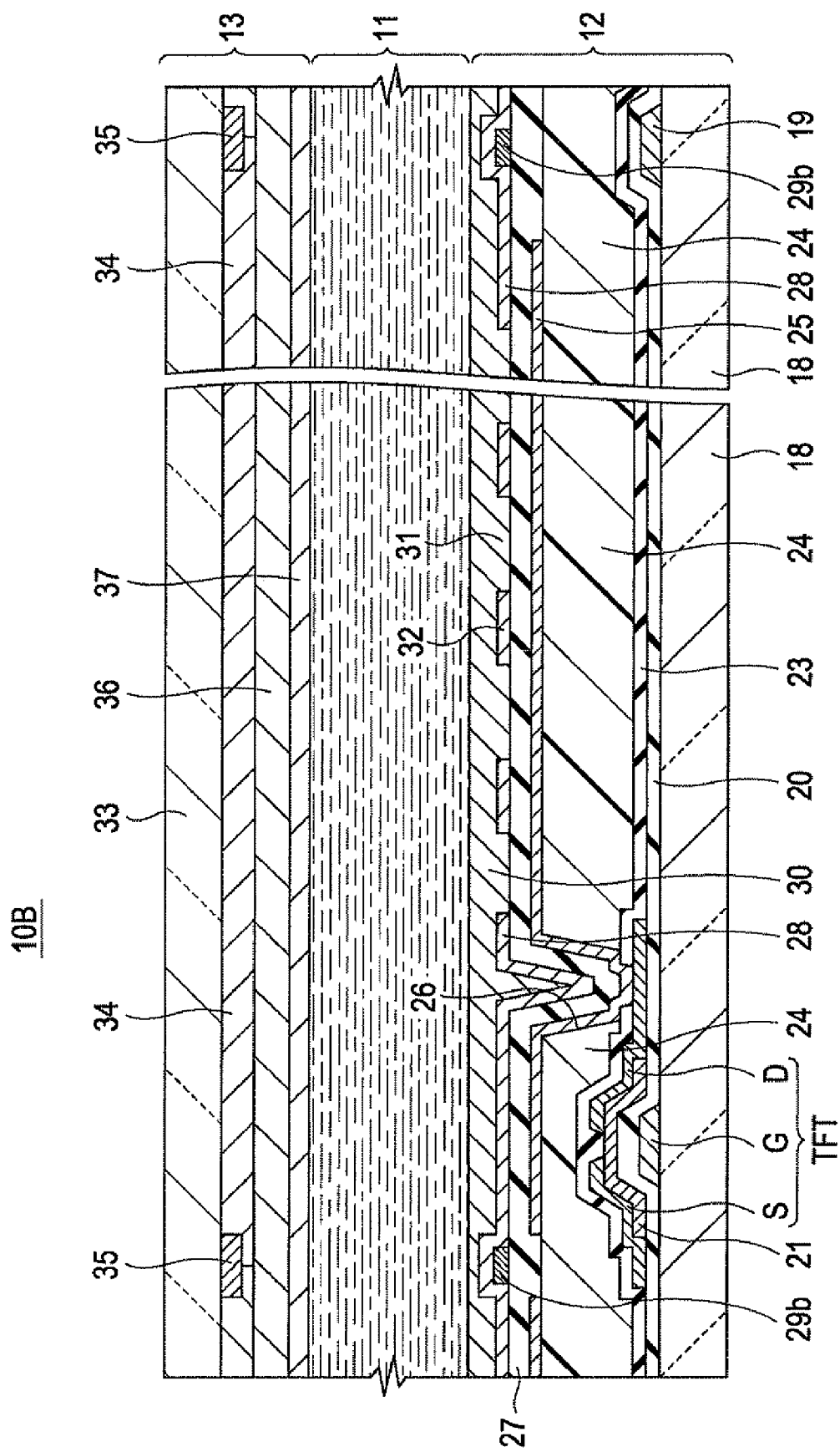

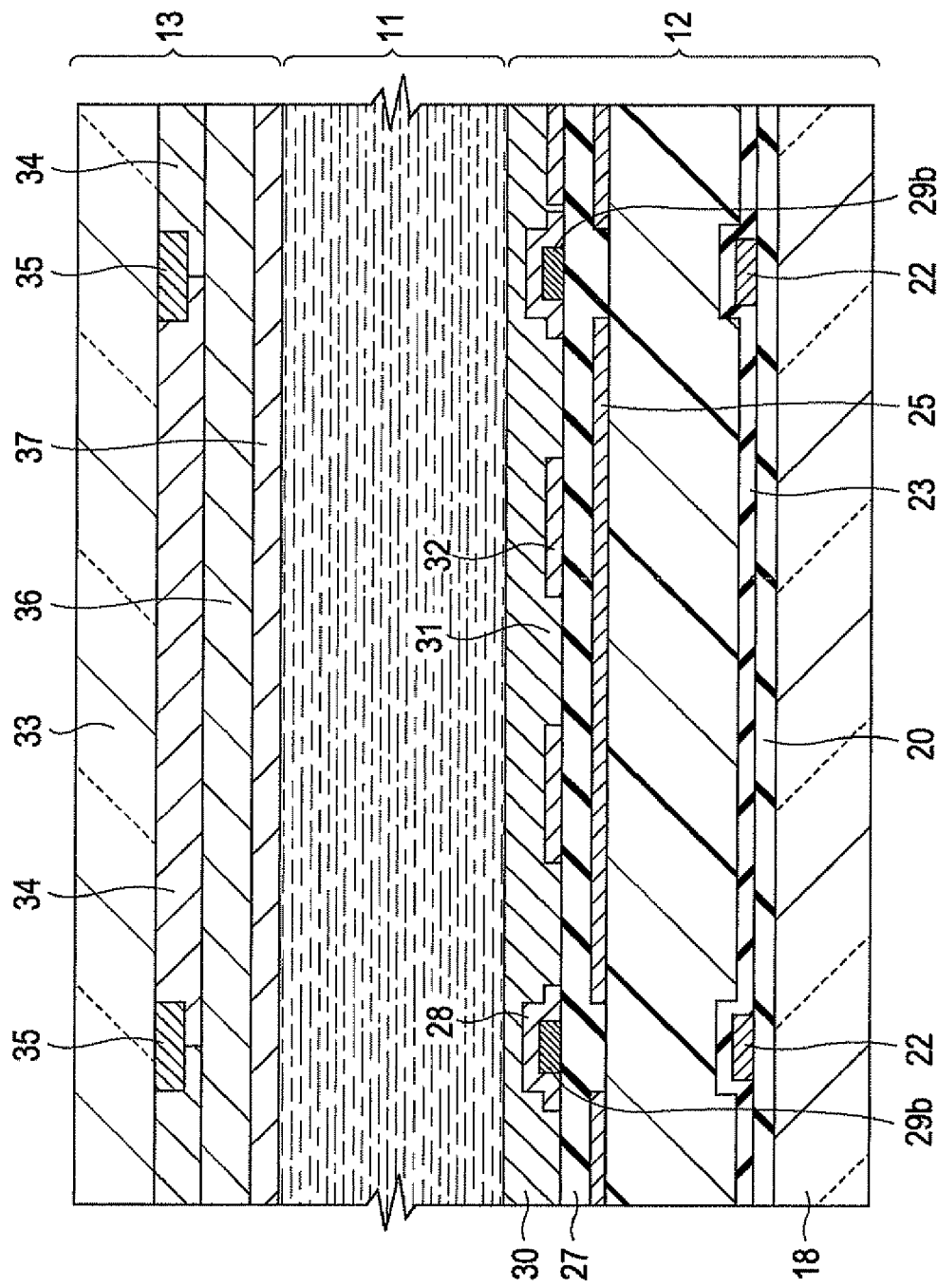

LIQUID CRYSTAL DISPLAY PANEL

This application claims the benefit of Japanese Patent Application No. 2008-168498, filed on Jun. 27, 2008. The entire disclosures of the prior applications are hereby incorporated by reference herein in their entirety.

BACKGROUND

1. Technical Field

The present invention relates to liquid crystal display panels adopting the horizontal electric field mode and, more particularly, to a liquid crystal display panel adopting the horizontal electric field mode, which includes an upper electrode having slit-shaped apertures and operating as a common electrode.

2. Field of Invention

Liquid crystal display panels, which are characterized by lightness in weight, small thickness and low power consumption as compared with cathode-ray tubes (CRTs), have been used for various types of electrical devices as displays incorporated therein. A principle of displaying images employed in such a liquid crystal display panel is such that, an amount of transmitted light or an amount of reflected light varies in accordance with alignment direction changes of individual liquid crystal molecules in proportion to intensity of an electric field applied to the liquid crystal molecules, each of which is initially aligned in a prescribed direction resulting from a rubbing process performed on alignment films having the liquid crystal molecules interposed therebetween.

There are two schemes in methods of applying an electric field to a liquid crystal layer included in a liquid crystal display, one being a vertical electric field mode, the other one being a horizontal electric field mode. In a liquid crystal display panel adopting the vertical electric field mode, an electric field, which is generated by a pair of electrodes having a liquid crystal layer interposed therebetween and extends in a direction substantially vertical to the pair of electrodes, is applied to liquid crystal molecules included in the liquid crystal layer. For liquid crystal displays adopting the vertical electric field mode, various modes, such as a twisted nematic (TN) mode, a vertical alignment (VA) mode and a multi-domain vertical alignment (MVA), are well known to those skilled in the art. In a liquid crystal display panel adopting the horizontal electric field mode, an electric field, which is generated by a pair of electrodes formed in a mutually insulated condition at the inside side of one of the pair of substrates having a liquid crystal layer interposed therebetween and extends in a direction substantially horizontal along the pair of electrodes, is applied to liquid crystal molecules included in the liquid crystal layer. For the liquid crystal display panels adopting the horizontal electric field mode, an in-plane switching (IPS) mode, in which the pair of electrodes are formed so as not to be overlapped in plan view, and a fringe field switching (FFS) mode, in which the pair of electrodes are formed so as to be overlapped in plan view, are well known to those skilled in the art.

Among these liquid crystal display panels employing various modes, a liquid crystal display panel employing the FFS mode includes a plurality of pairs of a common electrode and a pixel electrode, the common electrode and the pixel electrode being located on different layers, respectively, and having an insulating film interposed therebetween, and further, provides the common electrode or the pixel electrode located at a liquid crystal layer side with slit-shaped apertures through which an electric field extending in a substantially horizontal direction is applied to the liquid crystal layer.

Utilization of such a liquid crystal display panel employing the FFS mode leads to certain advantages, that is, a large viewing angle and improvement of image contrast, and therefore, nowadays, the liquid crystal display panels employing the FFS mode have been in widespread use. For liquid crystal display panels employing the FFS mode, there are two types which are well known to those skilled in the art, one being a type in which pixel electrodes are formed on planes the same as those on which thin-film-transistors (TFTs) operating as switching elements are formed (refer to JP-A-2007-327997), the other one being a type in which both the pixel electrodes and the common electrodes are located above TFTs (refer to JP-A-2008-32899).

Out of these types, in a liquid crystal display panel of the type in which both the pixel electrodes and the common electrodes are located above TFTs, the surfaces of TFTs and the like are coated by a interlayer film composed of a resin layer, and on the surface of this interlayer film, lower electrodes composed of a transparent conductive material are formed. Further, the lower electrodes can be operated as either the pixel electrodes or the common electrodes. In the case where the lower electrodes are allowed to operate as the pixel electrodes, contact holes are formed in the interlayer film, and through the contact holes, the pixel electrodes are electrically connected to the corresponding switching elements. Moreover, on the surface of an insulating film formed so as to cover the lower electrodes, an upper electrode composed of a transparent conductive material is continuously formed across a plurality of pixel areas. This upper electrode has sections partitioned in accordance with the pixel areas, and in each of the sections, a plurality of slit-shaped apertures are formed. The upper electrode is electrically connected to common wiring formed in an area surrounding a display region and operates as the common electrode. Out of the liquid crystal display panel types in which pairs of an upper electrode and a lower electrode, which are both located above TFTs, are formed, the liquid crystal display panel employing the FFS mode including the lower electrodes and the upper electrode operating as the pixel electrodes and the common electrode, respectively, has advantages that, respective areas of apertures located near TFTs and boundaries between pixel areas become larger, and no wiring associated with the common electrode exists within the display region, and as a result, a higher aperture ratio can be achieved.

However, the above-described liquid crystal panel employing the FFS mode has a disadvantage that, allowing the common electrode including sections each having slot-shaped apertures to be formed continuously across a plurality of pixel areas causes the common electrode to be electrically connected to the exterior in peripheral areas surrounding the display region, and as a result, the electrical resistance of the common electrode increases, and this increase of the electrical resistance of the common electrode results in occurrence of defects such as flickering and electrical crosstalk. On the other hand, for the liquid crystal display panels employing the IPS mode, as disclosed in, for example, JP-A-2005-258408, a method in which, in order to prevent increasing of respective electrical resistances of the pixel electrodes and the common electrode resulting from forming both the pixel electrodes and the common electrode by using a transparent conductive material, both the pixel electrodes and the common electrode are formed so as to have dual structures which are composed of a transparent electrode and a metallic electrode, is well known to those skilled in the art. However, in the case of the liquid crystal display employing the FFS mode, the pixel electrodes and the common electrode are overlapped in plan view, and as a result, the method of applying the dual structure composed of a transparent electrode and a metallic electrode to both the pixel electrodes and the common electrode leads to lowering of the aperture ratio, and thus, it is not preferable to adopt this method.

SUMMARY

Accordingly, it is desired to provide a liquid crystal display employing the FFS mode capable of reducing the probability of occurrence of flickering and electrical crosstalk by reducing the electrical resistance of the common electrode.

A liquid crystal display panel according to an aspect of the invention includes a pair of substrates which are disposed so as to be opposite each other and have a liquid crystal layer interposed therebetween, and one of the pair of substrates includes a plurality of scanning lines and signal lines which are arrayed on a display region so as to form a matrix shape, a common wiring formed on a peripheral area surrounding the display region, an interlayer film formed so as to cover at least the whole of the display region, pixel electrodes composed of a transparent conductive material, which are formed on the surface of the interlayer film in accordance with respective pixel areas partitioned by the plurality of scanning lines and the signal lines, an inter-electrode insulating film formed on the pixel electrodes and the interlayer film within the display region, and a common electrode composed of a transparent conductive material, which is formed on the whole of the inter-electrode insulating film, includes sections each having a plurality of slits formed therein, corresponding to respective pixel areas, and is electrically connected to the common wiring, wherein, on the surface of the common electrode, or between the common electrode and the inter-electrode insulating film, a conductive layer, which is composed of a material of a conductivity superior to a conductivity of the transparent conductive material composing the common electrode, is formed, in plan view, at positions overlapped with positions at which the plurality of scanning lines and the signal lines are formed.

A liquid crystal display panel according to an aspect of the invention includes pixel electrodes composed of a transparent conductive material, which are formed on the surface of the interlayer film in accordance with respective pixel areas partitioned by the plurality of scanning lines and the signal lines, an inter-electrode insulating film formed on the pixel electrodes and the interlayer film within the display region, and a common electrode composed of a transparent conductive material, which is formed on the whole of the inter-electrode insulating film, includes sections each having a plurality of slits formed therein, corresponding to respective pixel areas, and is electrically connected to the common wiring. By providing such a configuration as described above, it is possible to achieve a liquid crystal display panel capable of operating in the FFS mode according to the aspect of the invention. In addition, for the interlayer insulating film, it is possible to use an inorganic insulating film, such as a silicon oxide film or a silicon nitride film. Further, for the interlayer film, a photosensitive or non-photosensitive resin material having good transparency and being superior in electrical insulation can be selected and used. Furthermore, for the pixel electrode and the common electrode, a transparent conductive material, such as an indium tin oxide (ITO) or an indium zinc oxide (IZO), can be used.

Further, in the liquid crystal display panel according to the aspect of the invention, on the surface of the common electrode, or between the common electrode and the inter-electrode insulating film, a conductive layer, which is composed of a material of a conductivity superior to a conductivity of the transparent conductive material composing the common electrode, is formed, in plan view, at positions overlapped with positions at which the plurality of scanning lines and the signal lines are formed. In a liquid crystal panel employing the FFS mode, allowing the common electrodes having slot-shaped apertures to be formed continuously across a plurality of pixel areas causes the common electrode to be electrically connected to the exterior in peripheral areas surrounding the display region, and as a result, the electrical resistance of the common electrode increases. Due to this increase of the electrical resistance of the common electrodes, a voltage level of the common electrode is likely to vary, and this variation of the voltage level of the common electrode leads to arising of flickering and electrical crosstalk. However, a configuration in which, on the surface of the common electrode, or between the common electrode and the inter-electrode insulating film, a conductive layer, which is composed of a material of a conductivity superior to a conductivity of the transparent conductive material composing the common electrode, is formed, in plan view, at positions overlapped with positions where the plurality of scanning lines and the signal lines are formed, leads to equivalently reducing of the electrical resistance of the common electrode. Therefore, according to the aspect of the invention, it is possible to achieve a liquid crystal display panel capable of reducing the probability of occurrence of the flickering and electrical crosstalk, and displaying images of high quality.

In addition, the conductive layer, which is composed of a material of a conductivity superior to a conductivity of the transparent conductive material composing the common electrode, and is formed, in plan view, in positions where overlapped with positions where the plurality of scanning lines and the signal lines are formed and thus, has no effect on brightness of the liquid crystal display panel. Therefore, since the conductive layer is composed of a material of a conductivity superior to a conductivity of the transparent conductive material composing the common electrode, it does not matter whether the conductive layer is composed of a transparent material or an opaque material, and for the conductive layer, it is possible to use a material, such as a metallic thin film, a thin film composed of a conductive resin material resulting from mixing and dispersing of a filler metal into a resign, or a conductive carbon thin film.

Further, in a liquid crystal display panel according to the aspect of the invention, preferably, the conductive layer has a light shielding effect.

In existing liquid crystal display panels, for the purpose of increasing a contrast ratio by preventing leakage of light in areas near the scanning lines and the signal lines, a black matrix is formed in positions where the color filtering substrate side, which are overlapped, in plan view, in positions where the scanning lines and the signal lines are formed. Therefore, in a liquid crystal display panels according to the preferable aspect of the invention, the conductive layer having a light shielding effect is formed in positions where the color filtering substrate side, which are overlapped, in plan view, with the positions where the scanning lines and the signal lines are formed, and therefore, without any formation of the black matrix on the color filtering layer, it is possible to cause the conductive layer to perform the function of preventing leakage of light.

Further, in a liquid crystal display panel according to the aspect of the invention, preferably, the conductive layer is composed of a metallic material.

In comparison with a transparent conductive material, a metallic material has a significantly good conductivity and a light shielding effect. Therefore, in a liquid crystal display panel according to the preferred aspect of the invention, even when the thickness of the conductive layer composed of a metallic material is small, by using a metallic material as the conductive layer, it is possible to equivalently reduce the electrical resistance of the common electrode, and further, reduce an effect given on an alignment characteristic of liquid crystal molecules due to the thickness of the metallic material, and accordingly, it is possible to achieve a liquid crystal display panel capable of displaying images of high quality. As a metallic material used in a liquid crystal display panel according to the preferred aspect of the invention, it is possible to use a metallic material composed of aluminum, aluminum base alloy, molybdenum, tungsten, titanium, copper, or the like, and further, a one-layer structure or a multi-layer structure may be employed.

Further, in a liquid crystal display panel according to the aspect of the invention, preferably, the width of the conductive layer is substantially the same as or smaller than the width of each of the plurality of scanning lines and the signal lines.

In a liquid crystal panel according to the preferred aspect of the invention, allowing the width of the conductive layer to be substantially the same as or smaller than the width of each of the plurality of scanning lines and the signal lines leads to suppressing lowering of an aperture ratio, and thus, enables realization of a liquid crystal display panel capable of displaying images of high brightness. In particular, allowing the width of the conductive layer to be smaller than the width of each of the plurality of scanning lines and the signal lines enables preventing of lowering of the aperture ratio resulting from a condition in which the conductive layer runs off the edges of the scanning lines or the signal lines, which is caused due to a masking misalignment occurring during manufacturing processes, and the like.

Further, in a liquid crystal display panel according to the aspect of the invention, preferably, the width of the conductive layer is larger than the width of each of the plurality of scanning lines and the signal lines.

In a liquid crystal panel according to the preferred aspect of the invention, it is possible to reduce leakage of light in areas near the scanning lines and the signal lines, and thus, it is possible to use the conductive layer as a substitute for a black matrix, and further, achieve a liquid crystal display panel of a higher contrast ratio.

Further, in a liquid crystal display panel according to the aspect of the invention, preferably, the conductive layer extends to a peripheral area surrounding the display region, and there, is directly electrically connected to the common wiring.

The common wiring is normally composed of a metallic material the same as a metallic material composing the scanning lines or the signal lines. Further, a contact resistance between a transparent conductive material and a metallic material is more than a contact resistance between metallic materials. Therefore, in a liquid crystal display panel according to the preferred aspect of the invention, it is possible to reduce a constant resistance between the conductive layer and the common wiring to a great degree, and thus, it is possible to achieve a liquid crystal display panel capable of reducing the probability of occurrence of flickering and electrical crosstalk to a greater degree than ever before, and a liquid crystal panel capable of displaying images of high quality.

BRIEF DESCRIPTION OF THE DRAWINGS

FIG. 6 is a sectional view taken along the line III-III of FIG. 5.

FIG. 7 is a sectional view taken along the line VII-VII of FIG. 5.

DESCRIPTION OF EXEMPLARY EMBODIMENTS

Exemplary embodiments will be hereinafter described with reference to the accompanying drawings. Additionally, the exemplary embodiments described below are mere examples of a liquid crystal display panel according to aspects of the invention, which are described in order to embody technical ideas of the invention, and further, the invention is not intended to be limited to the exemplary examples but can be equivalently applied to any other embodiments falling within the scope of appended claims of the invention. In addition, in respective drawings used for explanations in this patent specification, so as to allow respective layers and members to have sizes identifiable from the drawings, respective layers and members are illustrated at different scales and are not illustrated in proportion to actual sizes thereof.

Figure 1:
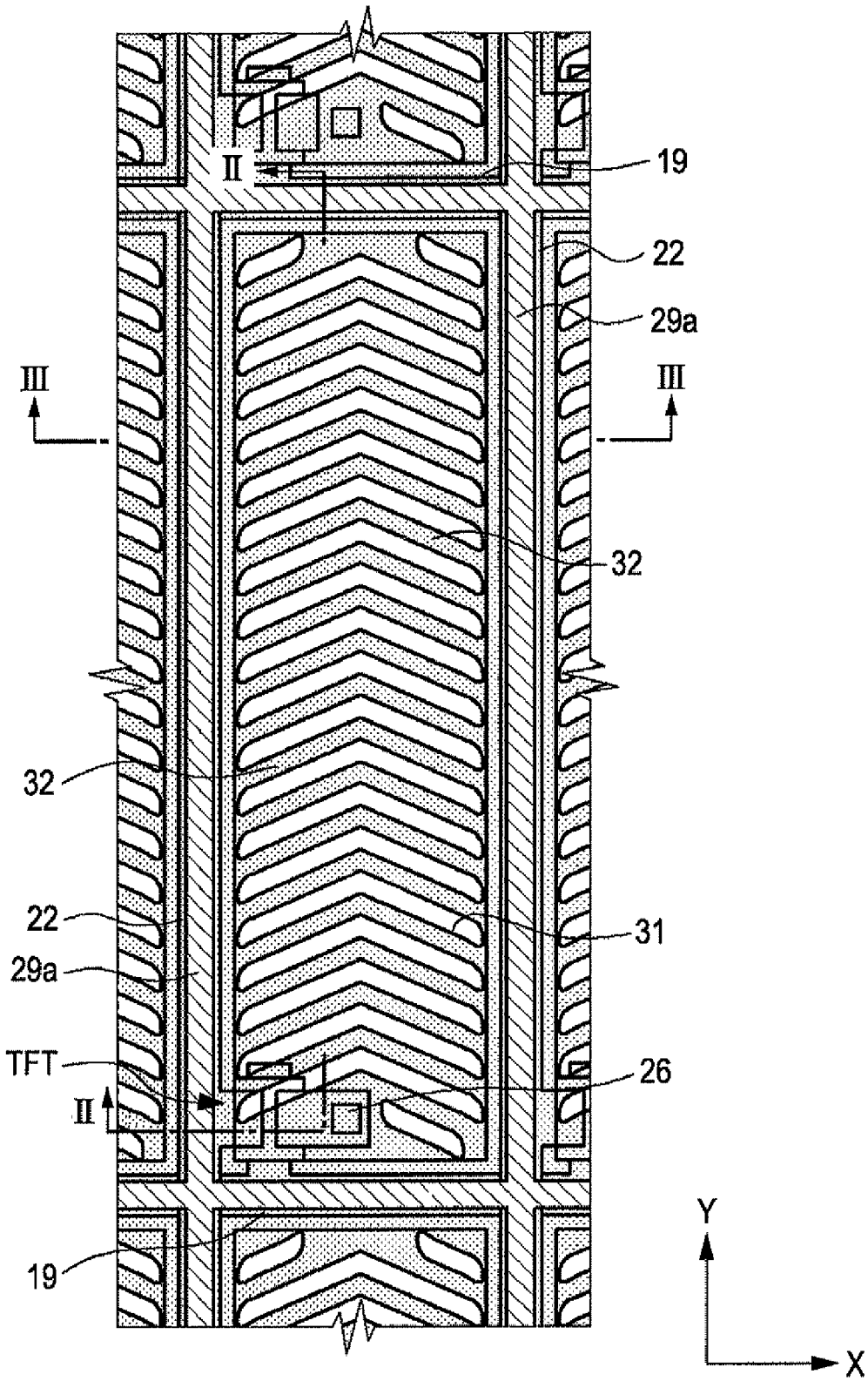
FIG. 1 is a plan view illustrating a one-pixel area of a liquid crystal display panel, which is viewed through a color filtering substrate, according to a first embodiment of the invention.
Figure 2:
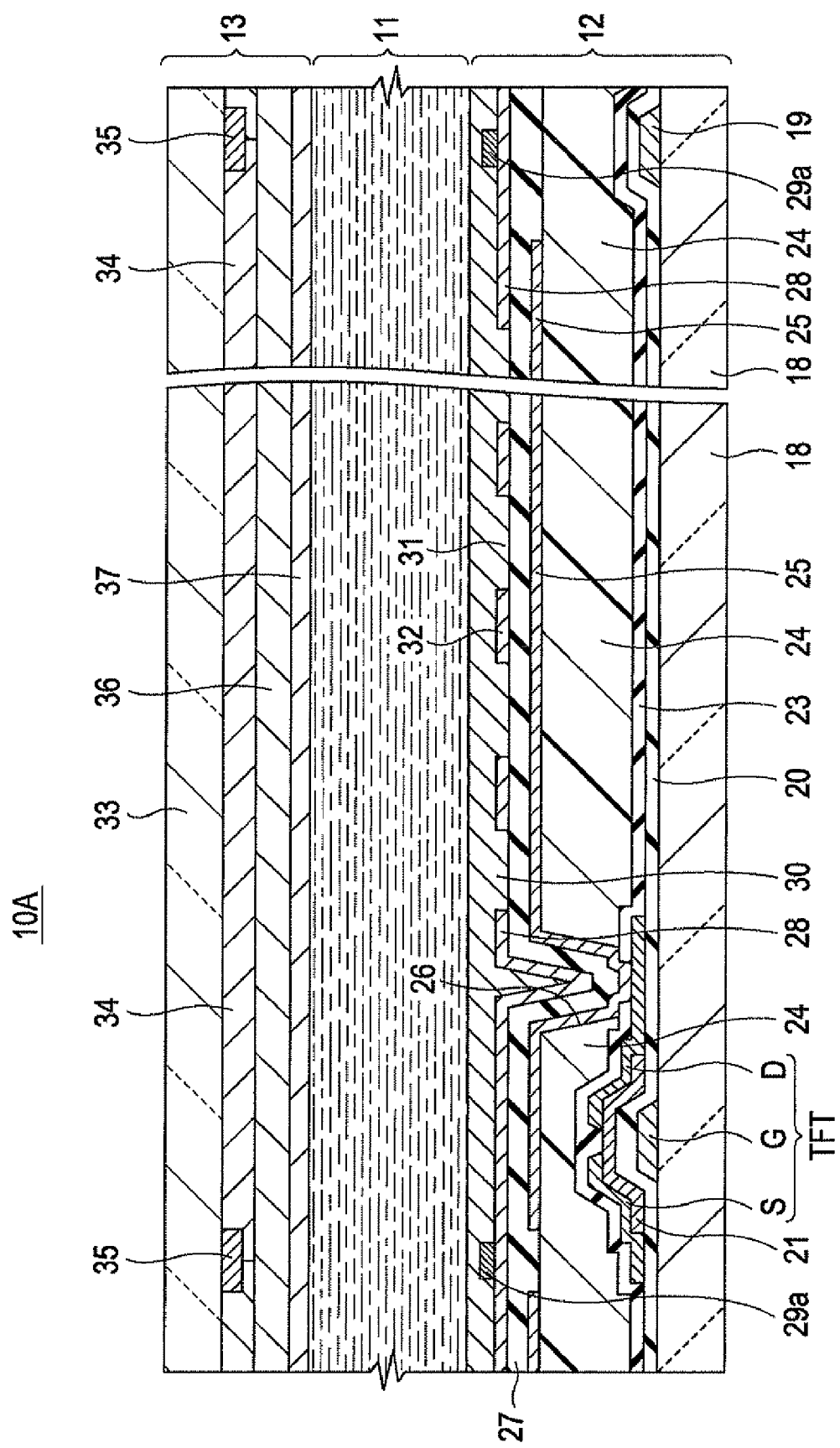
FIG. 2 is a sectional view taken along the line II-II of FIG. 1.
Figure 3:
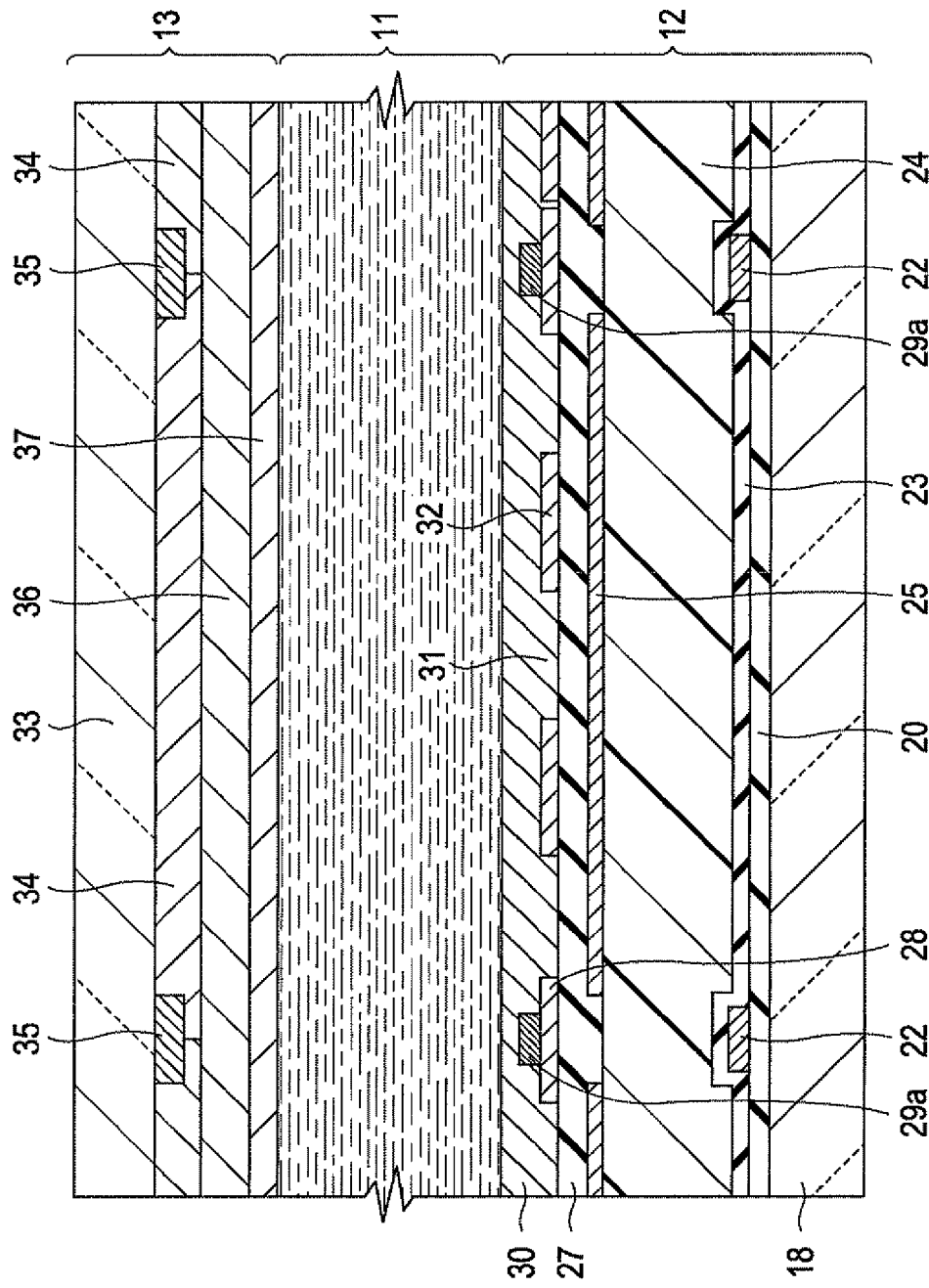
FIG. 3 is a sectional view taken along the line III-III of FIG. 1.
Figure 4:
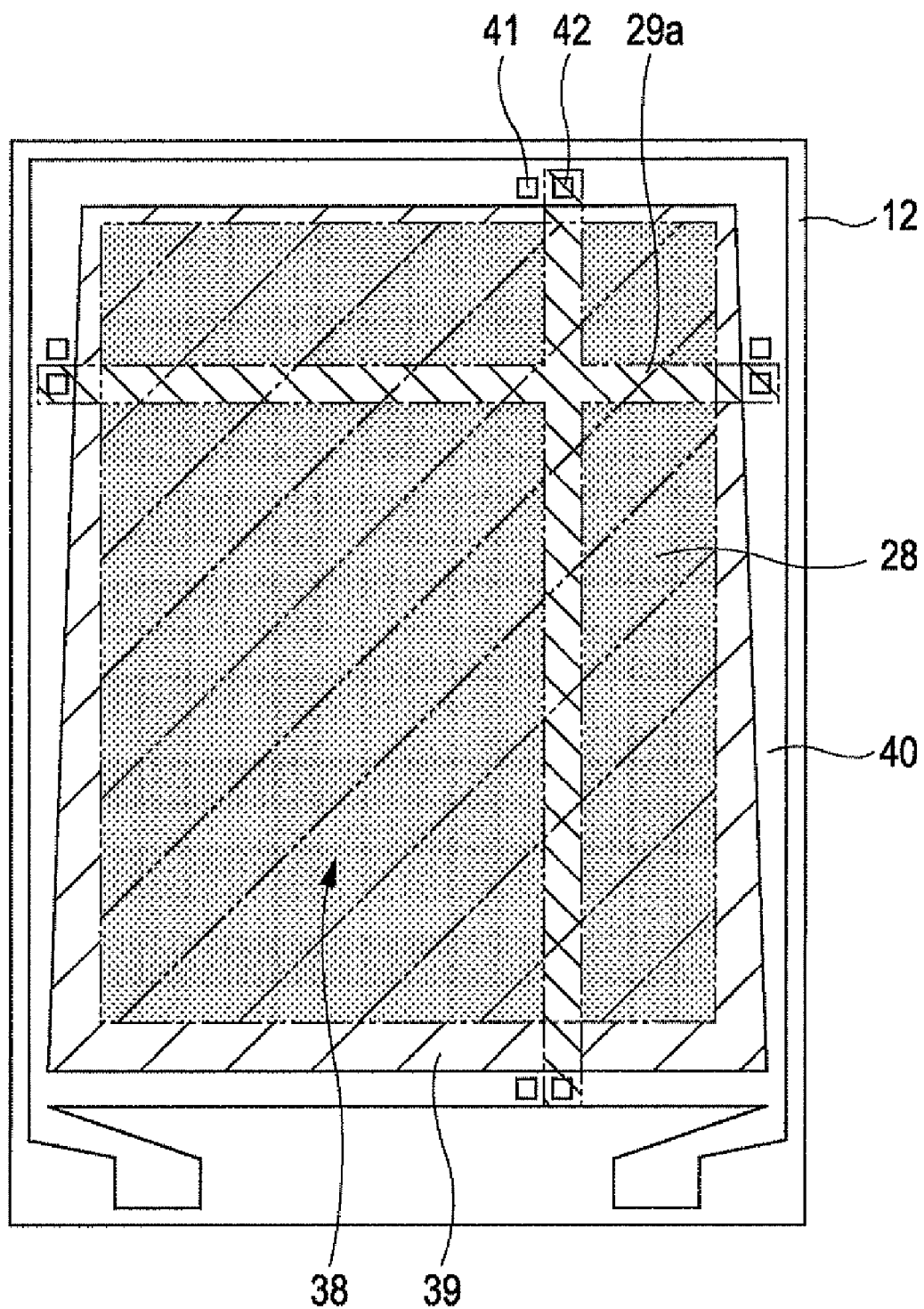
FIG. 4 is a plan view illustrating a part of a metallic wiring portion of a common electrode of a liquid crystal display panel according to a first embodiment of the invention.
Figure 5:
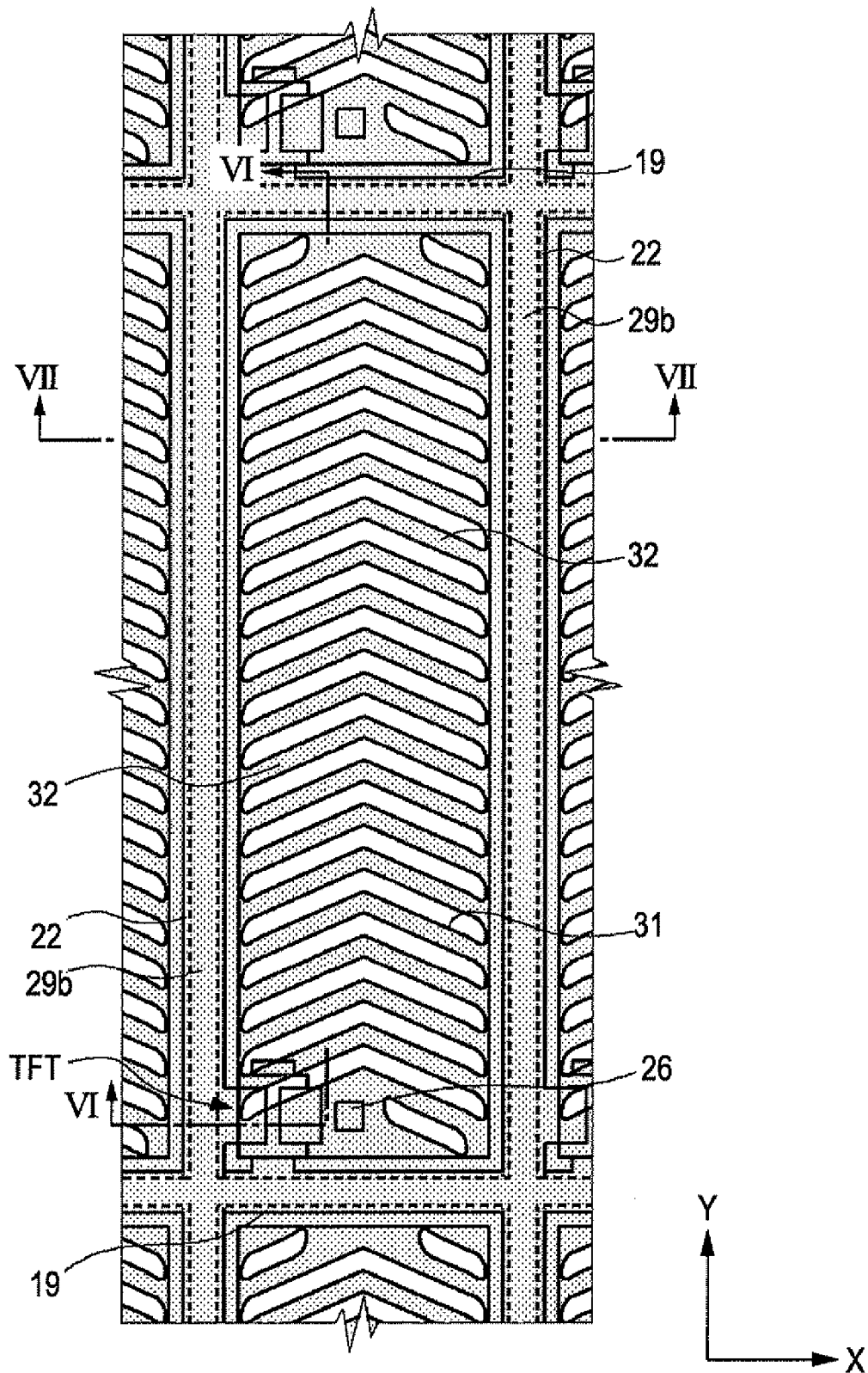
FIG. 5 is a plan view illustrating a one-pixel area of a liquid crystal display panel, which is viewed through a color filtering substrate, according to a second embodiment of the invention.

FIG. 1 is a plan view illustrating a one-pixel area of a liquid crystal display panel, which is viewed through a color filtering substrate, according to a first embodiment of the invention. FIG. 2 is a sectional view taken along the line II-II of FIG. 1. FIG. 3 is a sectional view taken along the line III-III of FIG. 1. FIG. 4 is a plan view illustrating a part of a metallic wiring portion of a common electrode of a liquid crystal display panel according to the first embodiment of the invention. FIG. 5 is a plan view illustrating a one-pixel area of a liquid crystal display, which is viewed through a color filtering substrate, according to a second embodiment of the invention. FIG. 6 is a sectional view taken along the line VI-VI of FIG. 5. FIG. 7 is a sectional view taken along the line VII-VII of FIG. 5.

First Embodiment

A liquid crystal display panel 10A according to the first embodiment of the invention will be hereinafter described with reference to FIGS. 1 to 4. The liquid crystal display panel 10A has a liquid crystal layer 11 interposed between an array substrate 12 and a color filtering substrate 13. The thickness of the liquid crystal layer 11 is maintained so as to be substantially constant by using columnar spacers, which are not shown in figures. Polarization plates (not shown in figures) are attached to the back side of the array substrate 12 and the front side of the color filtering substrate 13, respectively, and further, a backlight (not shown in figures) for emitting light is provided at the back side of the array substrate 12.

First, a configuration of the array substrate 12 will be described below. In the array substrate 12, a plurality of scanning lines 19 are formed mutually in parallel on the liquid crystal layer 11 side of a first substrate base 18 composed of a glass, a quartz, a plastic, or the like, and further, a gate insulating film 20 is formed so as to cover the scanning lines 19. The scanning lines 19 are composed of an opaque metal, such as an aluminum metal, an aluminum base alloy, or molybdenum, and extend in an X-axis direction shown in FIG. 1. Further, the gate insulating film 20 is composed of an inorganic insulating film, such as a silicon oxide film or a silicon nitride film.

On the gate insulating film 20, semiconductor layers 21 composed of, for example, an amorphous silicon, are formed, and further, a source electrode S and a drain electrode D are formed so as to be mounted partially on each of the semiconductor layers 21, respectively. The semiconductor layer 21 and a portion diverging from one of the scanning lines 19 are located so as to be opposite each other, and therebetween, the gate insulating film 20 is interposed, and further, the portion diverging from one of the scanning lines 19 composes a gate electrode G of a TFT. The source electrode S is composed of a portion diverging from one of signal lines 22. The signal lines 22 and the drain electrode D are composed of an opaque metal, such as an aluminum metal, an aluminum base alloy, or molybdenum, and the signal lines 22 extend in a Y-axis direction shown in FIG. 1.

A passivation film 23, which is composed of an inorganic insulating film, such as a silicon oxide film or a silicon nitride film, is formed so as to cover the semiconductor layer 21, the source electrode S and the drain electrode D, and further, an interlayer film 24, which is composed of a resin material, is formed so as to cover the passivation film 23. For the interlayer film 24, a photosensitive or non-photosensitive resin material having good transparency and being superior in electrical insulation can be selected and used. Pixel electrodes 25 composed of a transparent conductive material, such as ITO or IZO, are formed so as to cover the interlayer film 24. First contact holes 26 are formed so as to pass through the passivasion film 23 and the interlayer film 24, and reach the drain electrode D, and further, through each of the first contact holes 26, the pixel electrode 25 and the drain electrode D are electrically connected to each other.

An inter-electrode insulating film 27, which is composed of an inorganic insulating film, such as a silicon oxide film or a silicon nitride film, is formed so as to cover the pixel electrodes 25. So as not to cause the surfaces of the pixel electrode 25 and the interlayer film 24 to be in a rough condition, the inter-electrode insulating film 27 is formed under a forming film condition of a temperature lower than a temperature of the forming film condition under which the passivation film 23 is formed. Further, a common electrode 28 composed of ITO or IZO is formed above the pixel electrodes 25, that is, on the surface of the liquid crystal layer 11 side of the inter-electrode insulating film 27. This common electrode 28 is electrically connected to common wiring 40 (refer to FIG. 4) in peripheral areas surrounding the display region 38 through second contact holes 41. Moreover, on the liquid crystal layer 11 side of the common electrode 28, a conductive layer 29a, being composed of a material of an electrical conductivity superior to that of the common electrode composed of a transparent conductive material, is formed so as to be overlapped with the scanning lines 19 and the signal lines 22 in plan view. Additionally, the common electrode 28 as well as the conductive layer 29a formed on the common electrode 28 will be described below in detail. Further, a first alignment film 30, which is composed of, for example, a polyimide, is formed so as to cover the inter-electrode insulating film 27, the common electrode 28 and the conductive layer 29a. On the first alignment film 30A, a rubbing process in a direction along the scanning lines 19 is performed.

Next, a color filtering substrate 13 will be described below. The color filtering substrate 13 has a second substrate base 33 functioning as a base substrate, composed of a glass, a quartz, a plastic, or the like, and on the second substrate base 33, a color filtering layer 34 operative to allow color light (R, G, B or colorless) specific to respective sub-pixels to pass therethrough, and also a black matrix 35 are formed. A top coating layer 36 is formed so as to cover the color filtering layer 34 and the black matrix layer 35, and further, a second alignment film 37, which is composed of, for example, a polyimide, is formed so as to cover the top coating layer 36. Moreover, a rubbing process in a direction opposite to the direction of the rubbing process performed on the first alignment film 30 is performed on the second alignment film 37.

Furthermore, a liquid crystal display panel 10A according to the first embodiment can be realized by allowing the array substrate 12 and the color filtering substrate 13, each of which is formed so as to have such a configuration as described above, to be located so as to be opposite each other, and sealing the liquid crystal layer 11 inside a hermetically-closed area formed between the array substrate 12 and the color filtering substrate 13 subsequent to sealing peripheral areas by using a sealing material (not shown in figures). In the liquid crystal display panel 10A according to the first embodiment, a first polarization plate located on the array substrate 12 side and a second polarization plate located on the color filtering substrate 13 side are located so that a transmission axis of the first polarization plate and a transmission axis of the second polarization plate are orthogonal to each other, and further, the transmission axis of the second polarization plate located at the color filtering substrate 13 side is located so as to be in parallel with the Y-axis shown in FIG. 1. Further, providing such a configuration as described above results in a condition where the rubbing direction of the first alignment film 30 and respective main directions of electric fields generated between the common electrode 28 and the pixel electrodes 25 intersect with each other. Moreover, once a voltage difference is supplied between the common electrode 28 and the pixel electrode 25 composing a sub-pixel, liquid crystal molecules, which are aligned in parallel along with the rubbing direction in an initial condition, are rotated to align in the main direction of the electric field generated by the common electrode 28 and the pixel electrode, and then, are realigned. In accordance with this variation from the initial alignment condition of the liquid crystals to the realigned alignment condition of the liquid crystals resulting from supplying of the voltage difference, brightness for each sub-pixel is controlled.

Next, more specific configurations of the common electrode 28 and the conductive layer 29a will be described below. The common electrode 28 includes band-shaped electrode 32 each of which is composed of a plurality of slit-shaped apertures 31, each being of a shape approximately resembling an inequality sign "<", the longitudinal axis of which extends along the X-axis direction shown in FIG. 1. Each pixel electrode 25 and the corresponding band-shaped electrode 32 of the common electrode 28 function as a pair of electrodes composing a capacitor, and further, a part of the inter-electrode insulating film 27 interposed between each pixel electrode 25 and the corresponding band-shaped electrode 32 of the common electrode 28 functions as a dielectric film, and as a result, a storage capacitor for each sub-pixel is formed.

The slit-shaped apertures 31 are formed by exposing and etching the common electrode 28 by means of photolithography. The slit-shaped apertures 31 are formed so that the extension direction of each of the slit-type apertures 31 is inclined at an angle of approximately three to twenty-five degrees relative to the rubbing direction of the first alignment film 30, which extends along the extension direction of the scanning lines 19 in advance when the slit-shaped apertures 31 are formed. As a result, this formation allows the liquid crystal molecules to rotate to align in the same direction when a voltage difference is supplied between the pixel electrode 25 and the common electrode 28, and thus, it is possible to achieve displaying of images of high quality. In addition, each aperture of the slit-shaped apertures 31 is not only formed, as shown in FIG. 1, in a shape approximately resembling an inequality sign "<" arranged parallelly along the extension direction of the scanning lines 19, but also may be formed in a shape approximately resembling an inequality sign "<" arranged parallelly along the extension direction of the signal lines 22, or alternatively, may be formed in a bar shape which has no bending portion. Particularly, in the case where each of the slit-shaped apertures is formed in a bar shape, each bar may be formed so as to be parallel with or slanted relative to the extension directions of the scanning lines 19, or may be parallel with or slanted relative to the longitudinal extension directions of the signal lines 22, and further alternatively, each bar may be formed so as to be slanted in one of a plurality of directions.

As described above, forming the slit-shaped apertures 31 on the surface of the common electrode 28 leads to reducing of the area of the common electrode 28, and thus, results in increasing of an electrical resistance of the common electrode 28. Therefore, in the liquid crystal display panel 10A according to the first embodiment, the conductive layer 29a, having an electrical conductivity superior to that of the transparent conductive material composing the common electrode, is formed in a matrix so as to be overlapped with all of the scanning lines 19 and the signal lines 22 in plan view. Since the conductive layer 29a is formed in a position where in plan view, overlapped with locations where the scanning lines 19 and the signal lines 22 are formed, and thus, has no effect on brightness of the liquid crystal display panel 10A, it does not matter whether the conductive layer 29a is composed of a transparent material or an opaque material from a theoretical point of view. However, in the liquid crystal display panel 10A, for the purpose of preventing leakage of light in areas near the scanning lines 19 and the signal lines 22, as well as increasing of a contrast ratio, a black matrix 35 is formed on locations at the color filtering substrate 13 side, which are overlapped, in plan view, with the locations where the scanning lines 19 and the signal lines 22 are formed. Therefore, making the conductive layer 29a be composed of a light shielding material leads to further enhancement of the function of preventing occurrence of the leakage of light. As such a light shielding material that provides the conductive layer 29a with the light shielding function, a material, such as a metallic thin film, a thin film composed of a conductive resin material resulting from mixing and dispersing of a filler metal into a resin, or a conductive carbon thin film, can be used. In the case where a metallic thin film is used, a material, such as molybdenum, aluminum, aluminum base alloy, copper, chromium, tungsten or titanium, can be used.

Furthermore, in the liquid crystal display panel 10A according to the first embodiment, the size of the conductive layer 29a may be substantially the same as, smaller than, or larger than the width of each of the scanning lines 19 and the signal lines 22. Allowing the width of the conductive layer 29a to be substantially the same as or smaller than the width of each of the scanning lines 19 and the signal lines 22 leads to suppressing lowering of an aperture ratio, and thus, enables realization of the liquid crystal display panel 10A capable of displaying images of high brightness. Particularly, allowing the width of the conductive layer 29a to be smaller than the width of each of the scanning lines 19 and the signal lines 22 enables preventing of lowering of the aperture ratio resulting from a condition in which the conductive layer 29a runs off the edges of the scanning lines 19 or the signal lines 22, which is caused due to a masking misalignment occurring during manufacturing processes, and the like. Further, allowing the width of the conductive layer 29a to be larger than the width of each of the scanning lines 19 and the signal lines 22 enables reducing of the leakage of light due to misalignment of liquid crystals located near the scanning lines 19 and the signal lines 22, and further, enables the conductive layer 29a to be used as a substitute for a black matrix, and thus, without any additional particular layer, it is possible to achieve the liquid crystal display panel 10A of a high contrast ratio. In addition, the liquid crystal display panel 10A according to the first embodiment has been described so far by way of an example in which the conductive layer 29a is formed in a matrix so as to be overlapped with both the scanning lines 19 and the signal lines 22 in plan view; however, alternatively, the conductive layer 29a may be formed so as to be overlapped with either the scanning lines 19 or the signal lines 22 in plan view, and furthermore, may be formed so as to be thinned in appropriate portions.

Next, respective configurations of electrical connections of the common electrode 28 and the conductive layer 29a to common wiring 40 will be described below with reference to FIG. 4. On the surface of the array substrate 12 included in the liquid crystal display panel 10A according to the first embodiment, the common electrode 28 is formed across the whole of the pixel areas so as to cover the display region 38 in plan view. In a peripheral area of the display region 38, surrounding lines 39, which are connected to the scanning lines 19 and the signal lines 22, and extend from the inside of the display region 38, are formed, and further, on an outer portion of the peripheral area, the common wiring 40 is formed. This common wiring 40 is composed of the same metallic material as the scanning lines 19 and the signal lines 20. Moreover, the common electrode 28 extends to the common wiring 40 via layers located above the surrounding lines 39 formed in the peripheral area of the display region 38, and then, is electrically connected to the common wiring 40 through a plurality of second contact holes 41. Further, the conductive layer 29a, which is formed in a matrix, extends along the surface of the common electrode 28 to the common wiring 40, and then, is directly electrically connected to the common wiring 40 through third contact holes 42.

The common wiring 40 is composed of the same metallic material as the scanning lines 19 and the signal lines 20, and thus, has a small electrical resistance. However, a contact resistance between the common wiring 40 and the common electrode 28 composed of a transparent conductive layer is much more than a contact resistance between metallic materials. Therefore, in the liquid crystal display panel 10A according to the first embodiment, the common electrode 28 and the conductive layer 29a are formed so as to be independently connected to the common wiring 40 through the second contact holes 41 and through the third contact holes 42, respectively. Utilization of this configuration enables reducing of the contact resistance between the conductive layer 29a and the common wiring 40 to a great degree, and thus, it is possible to achieve the liquid crystal display panel 10A capable of reducing the probability of occurrence of the flickering and electrical crosstalk, and displaying images of high quality.

Second Embodiment

In the first embodiment, description has been made by way of an example in which the conductive layer 29a is formed on the surface of the common electrode 28, however, this conductive layer 29 can be also formed between the common electrode 28 and the inter-electrode insulating film 27. A liquid crystal display panel 10B having such a configuration will be hereinafter described with reference to FIGS. 5 to 7. Additionally, elements shown in FIGS. 5 to 7 having the same functions as the elements shown in FIGS. 1 to 3 are denoted by the same reference signs as the corresponding elements shown in FIGS. 1 to 3, respectively, and further, detailed description of the elements shown in FIGS. 5 to 7 which are denoted by the same reference signs as the elements shown in FIGS. 1 to 3 will be omitted. Furthermore, a configuration in which the common electrode 28 and a conductive layer 29b are electrically connected to the common wiring 40 in the liquid crystal display panel 10B according to the second embodiment is the same as or similar to that in the liquid crystal display panel 10A according to the first embodiment, and therefore, is omitted to be illustrated.

The liquid crystal display panel 10B according to the second embodiment has the same configuration as the liquid crystal display panel 10A according to the first embodiment, except for a fact that the conductive layer 29b is formed between the common electrode 28 and the inter-electrode insulating film 27. That is, the liquid crystal display panel 10B includes the pixel electrodes 25 and the inter-electrode insulating film 27 which are formed on the surface of the inter-layer film 24, and when viewing in plan view from the surface of the inter-electrode insulating film 27, the conductive layer 29b is formed at locations which are overlapped with locations where the scanning lines 19 and the signal lines 22 included in the array substrate 12 are formed. The conductive layer 29b can be composed of a material the same as or similar to that composing the conductive layer 29a included in the liquid crystal display panel 10A according to the first embodiment.

Above the pixel electrodes 25, that is, on the liquid crystal layer 11 side surface of the inter-electrode insulating film 27 and the conductive layer 29b, the common electrode 28, which has sections each having the slit-shaped apertures 31 formed therein, and is composed of a transparent conductive material, such as ITO or IZO, is formed. Further, the first alignment film 30, which is composed of, for example, a polyimide, is formed so as to cover the inter-electrode insulating film 27 and the common electrode 28, and a rubbing process is performed on the first alignment film 30 so that the rubbing direction is aligned along the extension direction of the scanning lines 19. The liquid crystal display panel 10B having such a configuration as described above results in being capable of providing advantages the same as or similar to those provided by the liquid crystal display panel 10A according to the first embodiment.

What is claimed is:

1. A liquid crystal display panel, comprising:
a pair of substrates which are disposed so as to be opposite each other and have a liquid crystal layer interposed therebetween,
wherein a first one of the pair of substrates includes:
a plurality of scanning lines and signal lines which are arrayed on a display region so as to form a matrix shape;
a common wiring formed on a peripheral area surrounding the display region;
an interlayer film formed so as to cover at least the whole of the display region;
pixel electrodes composed of a transparent conductive material, which are formed on the surface of the inter-layer film in accordance with respective pixel areas partitioned by the plurality of scanning lines and the signal lines;
an inter-electrode insulating film formed on the pixel electrodes and the interlayer film within the display region; and
a common electrode composed of a transparent conductive material, which is formed on the whole of the inter-electrode insulating film, includes sections each having a plurality of slits formed therein, corresponding to respective pixel areas, and is electrically connected to the common wiring,
wherein a second one of the pair of substrates includes:
a base;
a color filter layer formed on the base; and
a black matrix formed between the base and the color filter layer.
wherein, a conductive layer is formed directly on the top surface of the common electrode, the conductive layer being composed of a material of a conductivity superior to a conductivity of the transparent conductive material composing the common electrode, is formed, in plan view, at locations overlapped with locations at which the plurality of scanning lines and the signal lines are formed,
wherein the common electrode is electrically connected to the common wiring through a plurality of first contact holes, and the conductive layer is directly electrically connected to the common wiring through a plurality of second contact holes, and
wherein the interlayer film is formed to cover the signal lines.

2. The liquid crystal display panel according to claim 1, wherein the conductive layer has a light shielding effect.

3. The liquid crystal display panel according to claim 2, wherein the conductive layer is composed of a metallic material.

4. The liquid crystal display panel according to claim 2, wherein the width of the conductive layer is substantially the same as or smaller than the width of each of the plurality of scanning lines and the signal lines.

5. The liquid crystal display panel according to claim 2, wherein the width of the conductive layer is larger than the width of each of the plurality of scanning lines and the signal lines.

6. The liquid crystal display panel according to claim 1, wherein the conductive layer extends to the peripheral area surrounding the display region, and there, is directly electrically connected to the common wiring.

* * * * *